(12) United States Patent
Rogers et al.

(10) Patent No.: US 9,384,049 B2
(45) Date of Patent: *Jul. 5, 2016

(54) PREVENTING UNNECESSARY CONTEXT SWITCHING BY EMPLOYING AN INDICATOR ASSOCIATED WITH A LOCK ON A RESOURCE

(71) Applicant: Microsoft Corporation, Redmond, WA (US)

(72) Inventors: Andrew D. Rogers, Bellevue, WA (US); Neill M. Clift, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/954,841

(22) Filed: Jul. 30, 2013

(65) Prior Publication Data
US 2013/0318537 A1 Nov. 28, 2013

Related U.S. Application Data

(63) Continuation of application No. 12/544,376, filed on Aug. 20, 2009, now Pat. No. 8,510,738.

(51) Int. Cl.
*G06F 9/46* (2006.01)
*G06F 9/50* (2006.01)
*G06F 9/52* (2006.01)

(52) U.S. Cl.
CPC . *G06F 9/50* (2013.01); *G06F 9/526* (2013.01)

(58) Field of Classification Search
None
See application file for complete search history.

(56) References Cited

U.S. PATENT DOCUMENTS

| 3,930,126 | A | 12/1975 | Green |
| 5,659,784 | A | 8/1997 | Inaba |
| 5,721,921 | A | 2/1998 | Kessler |
| 5,887,143 | A | 3/1999 | Saito |
| 6,965,961 | B1 * | 11/2005 | Scott ............................ 710/310 |
| 7,512,950 | B1 | 3/2009 | Marejka |
| 2003/0236816 | A1 * | 12/2003 | Venkatasubramanian G06F 9/526 718/107 |
| 2004/0187118 | A1 | 9/2004 | Blainey |
| 2007/0067774 | A1 | 3/2007 | Kukanov |
| 2010/0174946 | A1 * | 7/2010 | Burdick et al. ................. 714/38 |

OTHER PUBLICATIONS

Arpaci-Dusseau, "Lecture 3: Synchronization" Intro to Operating Systems, 2000.
Kontothanassis, Leonidas I. "Scheduler-Conscious Synchronization" 1997.

(Continued)

*Primary Examiner* — Mengyao Zhe
(74) *Attorney, Agent, or Firm* — Judy Yee; John Jardine; Micky Minhas

(57) ABSTRACT

A method of avoiding unnecessary context switching in a multithreaded environment. A thread of execution of a process waiting on a lock protecting access to a shared resource may wait for the lock to be released by executing in a loop, or "spin". The waiting thread may continuously check, in a user mode of an operating system, an indicator of whether the lock has been released. After a certain time period, the thread may stop spinning and enter a kernel mode of the operating system. Subsequently, before going to sleep which entails costly context switching, the thread may perform an additional check of the indicator to determine whether the lock has been released. If this is the case, the thread returns to user mode and the unnecessary context switching is avoided.

12 Claims, 3 Drawing Sheets

(56) References Cited

OTHER PUBLICATIONS

Li, Tong et al. "Spin Detection Hardware of improved Management of Multithreaded Systems" IEEE Transactions on Parallel and Distributed Systems, Vo. 17, No. 6, Jun. 2006.
Sridharan, "implementing Scalable Locks and Barriers on Large-Scale Light-Weight Multithreaded Systems" Jul. 2006.
Agarwal,"Adaptive Backoff Synchronization Techniques" 1989, pp. 396-406.
Arpaci-Dusseau, "A Cooperative Approach to Two-Phase Waiting", pp. 1-16. Originally submitted to USPTO on Aug. 20, 2009.
Anderson, J. "Shared-Memory Mutual Exclusion: Major Research Trends Since 1986", Jun. 2001 pp. 1-41.
Anderson, T. "The Performance Implications of Thread Management Alternatives for Shared-Memory Multiprocessors" IEEE Transactions on Computers, Dec. 1989.
Anderson, T. "The Perfonnance of Spin Lock Alternatives for Shared-Memory Multiprocessors", IEEE Transactions on Parallel and Distributed Systems, Jan. 1990.
Dijkstra, E.W. "Solution of a Problem in Concurrent Programming Control" Communications of the ACM, vol. 8, No. 9, Sep. 1965, p. 569.
Yang, Jae-Heon "A Fast, Scalable Mutual Exclusion Algorithm", pp. 1-45 Oct. 1993.
Mike Blasgen, Jim Gray, Mike Mitoma, and Tom Price. "The Convoy Phenomenon". Computer Science. IBM Research Laboratory, Revised Jan. 1979.
Dijkstra. "Cooperating sequential processes". Technological University, Eindhoven, 1965.
Anderson, James, "Nonatomic Mutual Exclusion with Local Spinning" pp. 1-16, 2002.
Anderson, James, "Adaptive Mutual Exclusion with Local Spinning" pp. 1-35, 2000.
Marlin, Anna, "Empirical Studies of Competitive Spinning for a Shared-Memory Multiprocessor", 1991.
Marlin, Anna, "Competitive Randomized Algorithms for Non-Uniform Problems" Chapter 33, pp. 301-309, 1990.
Lim, Beng-Hong, "Waiting Algorithms for Synchronization in Large-Scale Multiprocessors" pp. 1-39, Aug. 1993.
Lamport, Leslie "A New Solution of Dijkstra's Concurrent Programming Problem" Communications of the ACM, vol. 17, No. 8, Aug. 1974, pp. 453-455.
Lamport, Leslie "On Interprocess Communication" Dec. 25, 1985.
Lamport, Leslie "A Fast Mutual Exclusion Algorithm" ACM Transactions on Computer Systems, vol. 5, No. 1, Feb. 1987, pp. 1-11.
Mellor-Crummey, John, "Algorithms for Scalable Synchronization on Shared-Memory Multiprocessors" ACM Trans. on Computer Systems Feb. 1991, pp. 1-41.
Ousterhout, John, "Scheduling Techniques for Concurrent Systems" IEEE Distributed Computer Systems, 1982, pp. 22-30.
U.S. Appl. No. 12/544,376, filed Aug. 20, 2009, Rogers.
Rogers, "Manipulating a Spin Bit Within the Wait Primitive", Feb. 12, 2009.

\* cited by examiner

PREVENTING UNNECESSARY CONTEXT SWITCHING BY EMPLOYING AN INDICATOR ASSOCIATED WITH A LOCK ON A RESOURCE

RELATED APPLICATIONS

This application is a continuation and claims benefit from U.S. Pat. No. 8,510,738 that was filed on Aug. 20, 2009, and that is incorporated herein by reference in its entirety.

BACKGROUND

Many operating systems allow applications, or computer programs, to be divided into multiple tasks that can execute in parallel. Multiple threads are typically allowed in a single process. Accordingly, a thread, which may be described as an execution path through a computer program and a kernel of an operating system, results when the computer program breaks into two or more concurrently executing tasks.

In multiprocessor computers, different threads of a multi-threaded application may be concurrently executed on different processors. The multiple threads within an application can share resources (e.g., a shared variable, a file, or a device). Because threads execute at the same time, if more than one thread writes to the same data item, the data item may be corrupted. To avoid such scenarios, in multithreaded applications, locks may be used to block a shared resource from concurrent access by different threads that would allow one thread to make changes to the resource in a way that would interfere with the other thread.

When a thread acquires a lock, it becomes an owner of the lock and blocks other running threads from accessing the resources until it releases the lock. The lock may be, for example, a spin lock, where the waiting threads wait in a loop, or "spin," while repeatedly checking whether the lock has been released by its owner.

Each thread executes in its context. The context of a thread can be defined as a set of values in hardware registers, stacks and other storage areas of the thread and an operating environment that the values define. Typically, when a processor switches from executing one thread to another, thread context switch occurs. For example, the context switch may occur when a thread waiting for a resource goes to sleep. Context switching consumes processor and operating system resources.

SUMMARY

The foregoing is a non-limiting summary of the invention, which is defined by the attached claims.

Performance and utilization of processor and operating system resources of a multithreaded environment may be improved if a number of costly context switches is reduced. A context switch may occur when a thread that is waiting on a lock on a shared resource (e.g., a memory location) to be released transitions to "sleep," or a sleep mode. In the sleep mode, the thread ceases running and relinquishes its control of a processor.

The thread that requests access to the resource shared by multiple threads may not be able to access the resource because the lock to the resource is acquired by another thread. While the thread that has requested the resource is waiting for the resource to become accessible, it may execute (e.g., in a loop) for a certain period of time while continuously checking whether the lock has been released. Upon expiration of this period, the thread may stop executing and then transitions into a kernel of the operating system and enters the sleep mode, which entails the costly context switching.

Accordingly, in some embodiments, an additional check is performed after the thread waiting on the lock to be released transitions into the kernel but before the thread transitions to the sleep mode. As a result of this additional check, it may be determined that, while the thread was transitioning into the kernel, the lock has been released and the thread may access the resource. Thus, unnecessary context switching may be avoided.

The foregoing is a non-limiting summary of the invention, which is defined by the attached claims.

BRIEF DESCRIPTION OF THE DRAWINGS

The accompanying drawings are not intended to be drawn to scale. In the drawings, each identical or nearly identical component that is illustrated in various figures is represented by a like reference character. For purposes of clarity, not every component may be labeled in every drawing. In the drawings.

DETAILED DESCRIPTION

The inventors have appreciated that context switching, which occurs when a thread of execution of a process of an application waiting on a locked shared resource goes to sleep, as known in the art, may consume processor and operating system resources. The shared resource may be, for example, a memory location allocated to a shared variable. A thread that gets access to the resource and thus temporarily "owns" the resource acquires a lock on the resource thus preventing other threads that commonly use the resource from accessing it. Therefore, typically, only one thread can access the resource at a time which prevents corrupting the resource.

In some embodiments of the invention, in a user mode of the operating system, the thread waiting on a lock on the resource to be released, may "spin," or execute in a loop for a certain period of time during which it continuously checks whether the lock has been released. The spinning thread may continuously check an indicator, which may be of any suitable format, of whether the lock has been released. Typically, upon expiration of the period of time, which may be defined as a number of iterations of the loop or in another suitable manner, the thread may transition into a kernel mode of the operating system and then go to sleep. This may lead to a costly context switch.

The inventors have recognized and appreciated that unnecessary context switching may be avoided. Accordingly, after a thread waiting for a lock to be released transitions into the kernel mode but before it goes to sleep, an additional check may be performed to determine whether the lock has been released. Thus, the thread may once more access the indicator to determine whether the lock has been released while the thread was transitioning into the kernel mode. If this is the case, the thread returns to the user mode where it may access the resource. Thus, the context switching may be avoided.

Figure 1:
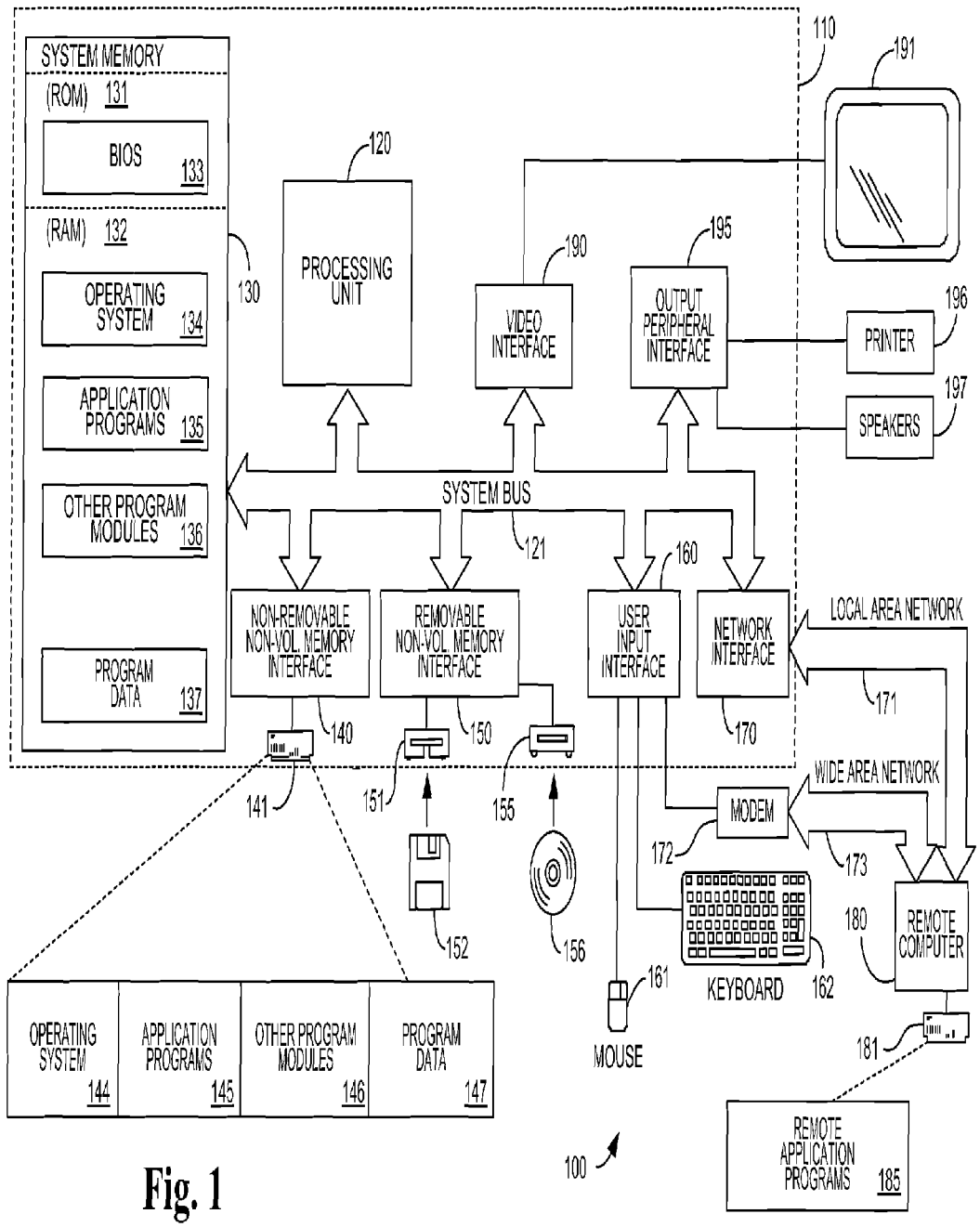
FIG. 1 is a high-level block diagram of a computing environment in which some embodiments of the invention may be implemented.

FIG. 1 illustrates an example of a suitable computing system environment 100 on which some embodiments of the invention may be implemented. The computing system environment 100 is only one example of a suitable computing environment and is not intended to suggest any limitation as to the scope of use or functionality of the embodiments of invention. Neither should the computing environment 100 be interpreted as having any dependency or requirement relating to any one or combination of components illustrated in the exemplary operating environment 100.

Some embodiments of the invention are operational with numerous other general purpose or special purpose computing system environments or configurations. Examples of well known computing systems, environments, and/or configurations that may be suitable for use with the embodiments of the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Some embodiments of the invention may be described in the general context of computer-executable instructions, such as program modules, being executed by a computer. Generally, program modules include routines, programs, objects, components, data structures, etc. that perform particular tasks or implement particular abstract data types. Some embodiments of the invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing some embodiments of the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different reference characters here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

According to some embodiments of the invention, multiple threads of execution may be executed on a computing device which may have one or more processors. The threads may be invoked by a single process of an application or by multiple processes of the same or different applications. The multiple threads may execute in parallel and may request access to the same shared resource. It may be desirable to allow only one or a certain number of threads of the multiple threads to access the resource at a time.

A thread that acquires a lock to the access to the resource may become an owner of the resource. For simplicity of the representation, it may be assumed that one thread may acquire access to the shared resource at a time, even though it should be appreciated that, in some embodiments, more than one thread may access (e.g., read) the resource at a time.

One or more threads that have requested access to a shared resource that is protected by a lock may wait for the lock to become released. Thus, in some embodiments of the invention, a thread waiting until the lock is released may execute, or "spin," in a loop which may be referred to as busy waiting. The spin lock implemented in some embodiments of the invention may be referred to as a hybrid lock because, after a time period, the waiting thread stops spinning and goes to sleep. While the waiting thread spins, it may continuously check whether the lock is released. For example, the thread may access a location in a memory or any other suitable object which provides indication of whether the lock has been released. Such indication may be provided, for example, as an indicator located, in a suitable component of the computing device. The indicator may be of any suitable format. For example, the indicator may be a bit, a single or a multi-bit word, a counter, a register, a value or of any other suitable format. In embodiments of the invention where a waiting thread spins, the indicator may be referred to as a spin bit.

After the waiting thread spins in a user mode of an operating system of the computing device for certain period of time, the thread may transition into a kernel mode of the operating system. The period of time upon expiration of which the waiting thread stops spinning may be determined in any suitable manner. For example, it may be set manually by a user or it may be determined dynamically.

Conventionally, after entering the kernel mode, the waiting thread that was not able to acquire the lock to the resource within the certain period of time goes to sleep, or enters a sleep mode, upon which a context switch may occur. When later the lock is released by the owner of the lock, the releasing thread may wake up the thread that is sleeping.

It is possible that while the waiting thread transitions into the kernel mode which may be a costly operation that take some time, the lock owner may release the lock which may be reflected in the indicator as discussed above. Thus, in some embodiments, the waiting thread that has transitioned into the kernel mode, before going to sleep, may perform an additional check on whether a state of the indicator has changed. The state of the indicator may change if the lock of the shared resource has been released. Consequently, rather than going to sleep, the waiting thread may return to the user mode to obtain a lock on the resource. Thus, unnecessary context switching may be avoided.

Figure 2:
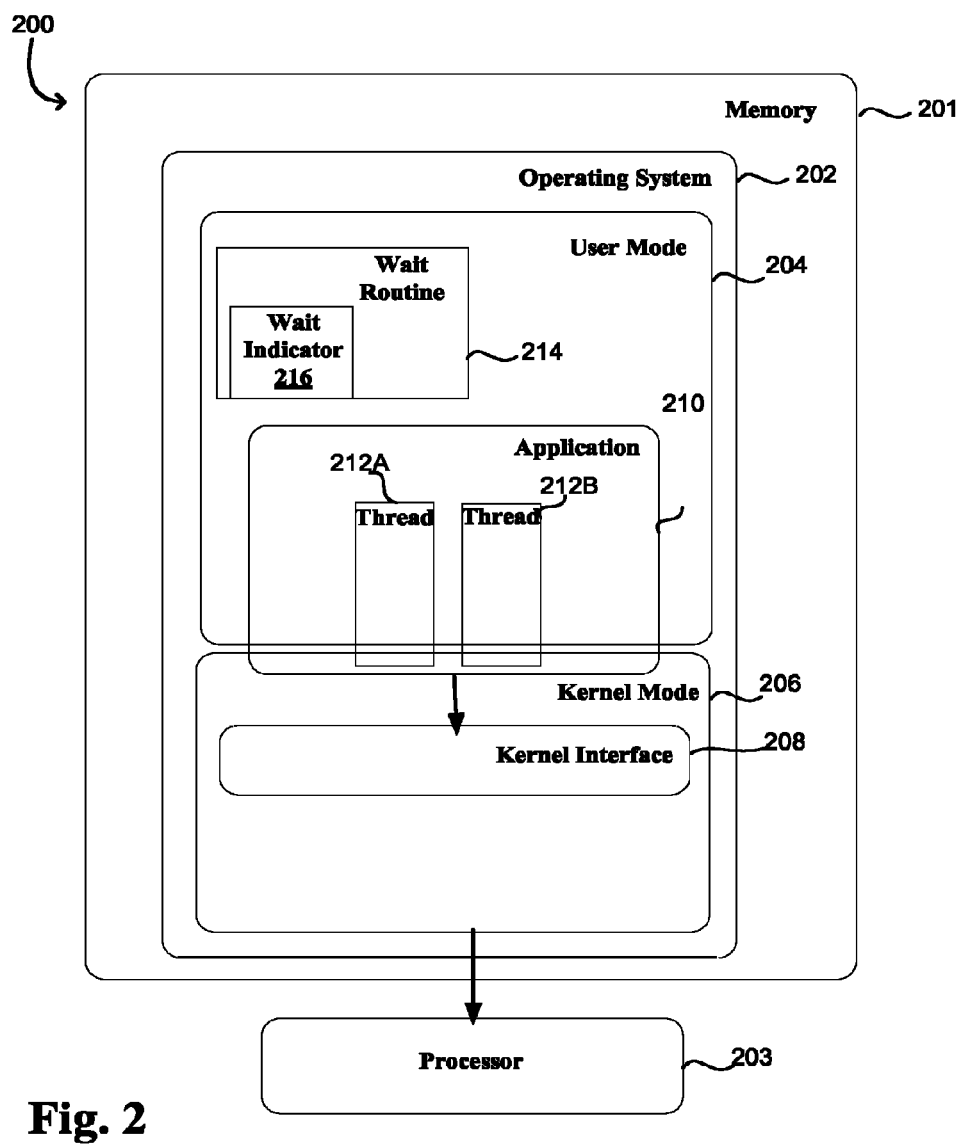
FIG. 2 is a high-level exemplary diagram of a computing device in which some embodiments of the invention may be implemented.

FIG. 2 is a simplified illustration of a computing device 200 (e.g., computer 110) in which some embodiments of the invention may be implemented. For simplicity of the representation, computing device 200 is shown in FIG. 2 to comprise memory 201 and a processor 203. However, it should be appreciated that computing device 200 may comprise any other suitable components and may communicate with various peripheral devices and other computing devices. Moreover, computing device 200 may be a multi-processor computer.

In this example, operating system 202 in memory 201 of computing device 200 comprises a user mode 204 and a kernel mode 206. An application 210, which may be any type of a software application, is executed in user mode 204 of operating system 202. It should be appreciate that multiple applications may be executed on the computing device. Application 210 may be referred to as a process, or a task, when instructions included in application 210 are executed by processor 203 which may be any suitable processor (e.g., processing unit 120 shown in FIG. 1). As discussed above, application 210 may be a multithreaded application and multiple threads may be executed by one or more processors to performs a task of application 210.

FIG. 2 illustrates that application 210, executed in user mode 204, may request access to a kernel of operating system 202 and to thus execute in kernel mode 206. The kernel, which is a term used in the art, may be defined as a component of the operating system that manages various components of the computing device such as, for example, memory, processor(s), input/output (IP) devices and other components. Application 210 may communicate with kernel mode 206 via a kernel interface 208 which may be any suitable interface. For example, it may be a system call interface. The kernel of operating system 202 may create and schedule processes and threads.

As discussed above, in some embodiments, application 210 may be a multithreaded application. Accordingly, FIG. 2 schematically shows that a processor executing application 210 may execute thread 212A and thread 212B. It should be appreciated that any suitable number of threads may be executed within a processes.

Threads 212A and 212B within application 210 may attempt to access a shared resource. It should be noted that the shared resource may be any suitable resource such as, for example, a variable, a file, a block of memory, a single object, a container including multiple objects, a device or other resource than may need to be accessed by multiple threads. In some embodiments, the shared resource may be a critical section as known in the art. In other words, the shared resource may be any software or hardware resource concurrent access to which by multiple threads, which may execute in parallel, may need to be prevented.

In addition, in some embodiments, a lock which may be referred to as a reader/writer lock may be used to protect a piece of data. In such scenarios, it may be desirable that multiple readers get concurrent access to the piece of data, but if a writer updates the piece of data, only the writer may obtain an exclusive access to it. Such locks may be particularly useful in scenarios where data needs to be read frequently and updated infrequently.

It should be appreciated that, in some embodiments, more than one thread may "own" the lock on a shared resource and threads that requested access to the resource may be placed into a queue or in other suitable data structure. Furthermore, in some embodiments, the lock may be exclusive when only one thread my access the shares resource at a time.

A thread that gets the access to the resource acquires, in user mode 204, a lock on the resource (not shown). The lock may be of any suitable type. For example, the lock may be a "blocking" lock which may cause a thread requesting the lock to be blocked, or suspended, e.g., to go to "sleep" which is the term used in the art. Such thread releases its resources and relinquishes its control of a processor (e.g., a central processing unit). Furthermore, the lock may be a "spin" lock in which case the thread requesting access to a memory location waits in a so-called busy wait until the lock is available while continuously checking whether the lock has been released. In the busy wait, the waiting thread is not suspended and executes in a loop, or "spins." The spinning thread retains control of the processor. Other types of locks may be implemented as well.

In some embodiments of the invention, the lock may be a "spin" lock. Thus, when a thread, for example, thread 212A of execution of application 210 attempts to access a shared resource which is locked by another thread, for example, thread 212B, thread 212A may repeatedly continue to request the lock by checking for an indication within an event that the lock has been released. In some embodiments, the event may be, for example, a wait primitive which, when executed, may signal the waiting thread that the lock has been released.

A thread waiting in a "spin" lock may wait for a certain period of time and to thus execute a certain number of iterations of a "spin," or wait, loop. The number of iterations may be predetermined or may be determined dynamically. For example, a counter may be maintained to keep track of a current number of iterations of the wait loop and when a threshold number of iterations is reached, the thread may stop spinning. Subsequently, after a certain number of the iterations, the thread that has stopped spinning may transition into a kernel, which is schematically shown in FIG. 2 by blocks representing threads 212A and 212B partially located in kernel mode 206 of operating system 202. The transitioning of the waiting thread, in this example, thread 212A, into the kernel mode may be followed by a context switch which may be costly in terms of processor and operating system resources.

In some embodiments, these processes may be referred to as a two-phase waiting where a thread may "spin" on a lock for a certain period of time and then go to sleep, or block. The thread may later be awaken by a thread that has released the lock.

As shown in FIG. 2, a wait routine 214 may be executed in user mode 204. However, it should be appreciated wait routine 214 may be executed at least partially in kernel mode 206 as well. Moreover, it should be appreciated that wait routine 214 or any other suitable program component may be executed by the thread waiting on the lock to be released. In embodiments of the invention in which Microsoft® Windows® operating system is employed, wait routine 214 may be a wait primitive that is a primitive that executes while waiting on an event. In this example, the event may be a release of the lock on a shared resource.

According to some embodiments of the invention, when thread 212A tries to acquire the lock protecting access to a resource which is "owned" by another thread, an indicator may be set indicating that the access to the resource is locked. The indicator may be of any suitable format and may be located within wait routine 214. It should be appreciated that the indicator may be located in any other suitable location. The indicator may be, for example, obit, a single or a multi-bit word, a counter, a register, a value or of any other suitable format.

In FIG. 2, the indicator is shown by way of example only as a wait indicator 216 within wait routine 214 in user mode 204. In this example, wait indicator 216 may be, for example, a bit which is set (e.g., to 1) when the lock is acquired. It should be appreciated that wait routine 214 may comprise more than one indicator associated with a lock "owned" by a certain thread.

According to some embodiments of the invention, after thread 212A waiting on the lock to be released "spins" for a certain time and then transitions into kernel mode 206, and prior to the thread's wing to sleep, an additional check is performed to determine whether a state of wait indicator 216 has changed. Thus, in some embodiments of the invention, the kernel of operating system 202 is enhanced and a call, via kernel interface 208, is made to user mode 204 to access wait indicator 216 within wait routine 214. If the state of wait indicator 216 indicates that the lock has not been released, thread 212A goes to sleep, or transitions into a sleep mode.

The state of wait indicator 216 that has been previously set may be changed when the thread owner such as thread 212B releases the lock. Thus, if the bit of wait indicator 216 has been cleared (e.g., changed from 1 to 0), which indicates that the lock has been released, thread 212A, instead of going to sleep, may transition back into user mode 204 to get access to the shared resource which is no longer locked. This allows bypassing in this case unnecessary context switching which would otherwise occur and to thus improve performance and save costs.

It should be appreciated that, in some embodiments of the invention, the lock may be acquired such that the waiting thread does not spin on the lock. In such embodiments, the indicator may be registered in a lock in any suitable manner. For example, a block of memory may be queued to a list in the lock. Subsequently, a thread that releases the lock may traverse the list to clear the indicator by de-queuing the block of memory from the list. Thus, the lock may be checked directly.

Figure 3:
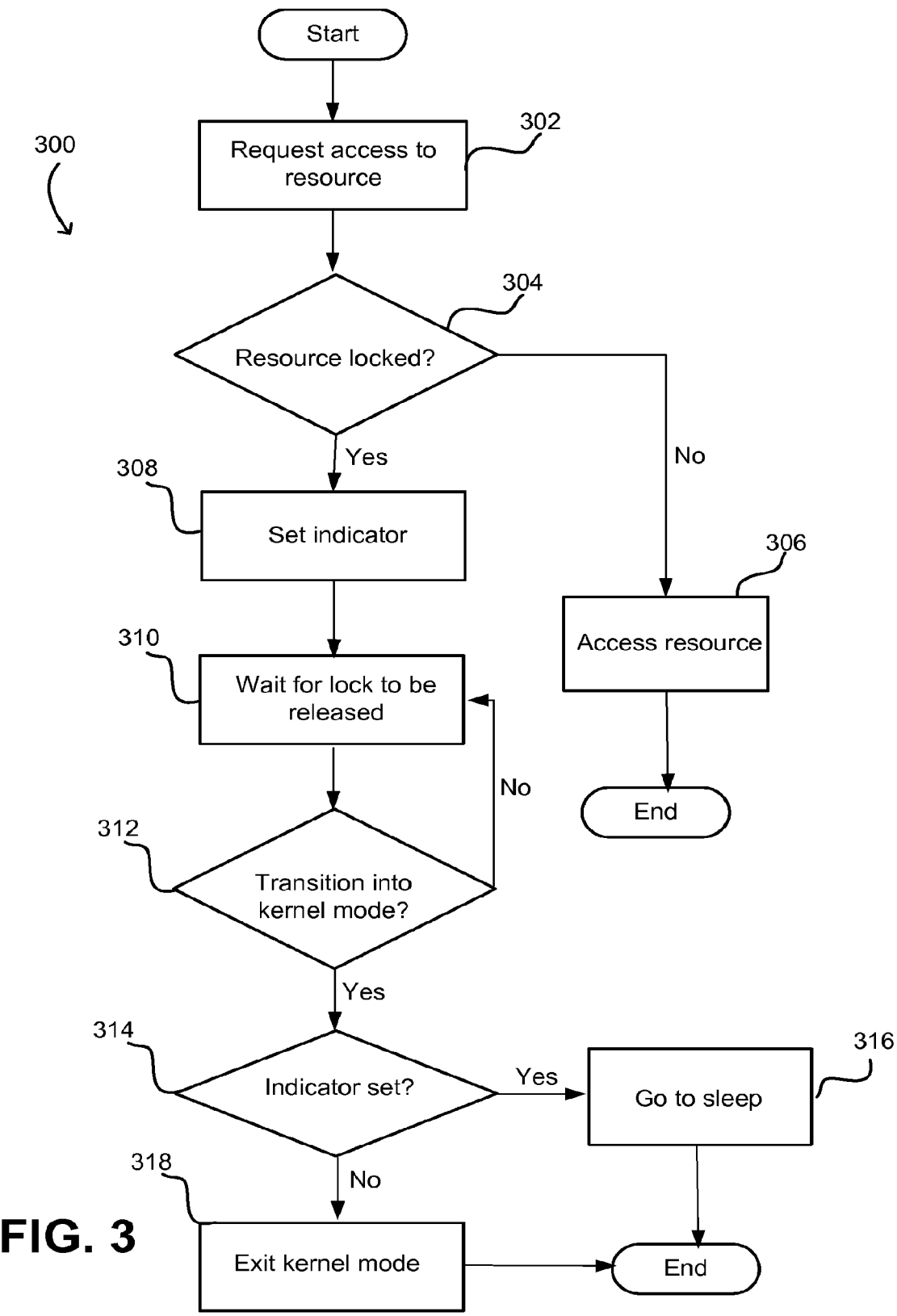
FIG. 3 is a flowchart providing an illustration of a method of performing an additional check before a thread waiting on a lock to be released goes to sleep, according to some embodiments of the invention.

FIG. 3 illustrates a process 300 of executing a computing device (e.g., computer 110 or 200) to perform an additional check before a waiting thread transitions into the sleep mode and thus avoiding context switching, according to some embodiments of the invention. The process 300 may start at any suitable time. For example, process 300 may start when thread 212A attempts to acquire a shared resource. Thus, at block 302, thread 212A may request access to the resource. Next, at decision block 304, it may be determined whether the resource is locked by another thread such as thread 212B. It should be appreciated that threads 212A and 212B of a process of execution of application 210 are discussed for the purposes of illustration only and threads of different processes, including processes executed by more than one processor may be substituted.

When it is determined, at block 304, that the access to the resource is not blocked, process 300 may continue to block 306 where the thread requesting the resource (e.g., thread 212A) may access the resource. Process 300 may then end.

Alternatively, when it is determined, at block 306, that the resource is locked, process 300 may branch to block 308 where an indicator (e.g., wait indicator 216) of whether or not the lock acquired by another thread has been released may be set. In this example, since it has been determined that that the access to the resource is locked, the indicator may be set to indicate that the access to the resource is locked.

Next, at block 310, the thread that has unsuccessfully attempted to acquire the lock, may wait on the lock to be released by continuingly checking a state of the indicator such as wait indicator 216. As discussed above, such busy waiting may be referred to as spinning. For example, thread 212A waiting on the lock acquired by thread 212B to be released, may execute in a wait loop. After a period of time which may be predetermined (e.g., set automatically or manually by a user of the computing device) or determined dynamically, the thread 212A may stop spinning.

Consequently, at decision block 312, it may be determined whether the waiting thread transitions into a kernel mode (e.g., kernel mode 206). It may occur, for example, upon expiration of the period of time as discussed above. If it is determined, at block 312, that the waiting thread transitions into a kernel mode, process 300 may continue to block 314 where it may be determined whether the indicator of whether the lock has been released is set. Thus, before going to sleep, the waiting thread performs an additional check on the indicator. It may be the case that during the time when the waiting thread was transition into the kernel mode, the thread that "owned" the lock has released the lock. Thus, a state the indicator such as a bit in wait routine 214 (e.g., a wait primitive) may have been changed (e.g., the previously set bit may be cleared). Therefore, the waiting thread may not need to go to sleep, or block, which allows avoiding costly context switching.

If it is determined, at block 314, that the indicator continues being set (or otherwise indicates that the lock has not been released), the waiting thread may go to sleep, as shown at block 316. Process 300 may then end. Alternatively, if it is determined, at block 314, that the indicator indicates that the lock is released, process 300 may branch to block 318 where the waiting thread (in this example, thread 212A) may exit the kernel mode and transition back into a user mode, at block 318. This allows avoiding the costly context switching. Process 300 may then end.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outline herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed, in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (hut for use of the ordinal tert to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method performed on a computing device that includes at least one processor and memory, the method comprising:
   spinning, by the computing device via a thread in a first mode, on a resource that is locked, where the spinning comprises continuously checking a state of the resource, where the state indicated whether the resource is locked or unlocked;
   determining, by the computing device in response to the thread spinning for a predetermined period of time, that the thread is to be transitioned from the first mode to a second mode and put to sleep;
   transitioning, by the computing device in response to determining that the thread is to be transitioned from the first mode to the second mode, the thread to the second mode;
   checking, by the computing device via the thread in response to the thread being transitioned from the first mode to the second mode and prior to the thread being put to sleep, the state of the resource;
   returning, by the computing device in response to the checked state indicating that the resource is no longer locked, the transitioned thread from the second mode back to the first mode without putting the thread to sleep; and
   putting, by the computing device in response to the checked state indicating that the resource is still locked, the transitioned thread to sleep.

2. The method of claim 1 where the method does not result in a context switch if the transitioned thread is returned back to the first mode without being put to sleep.

3. The method of claim 1 where the first mode is a user mode.

4. The method of claim 1 where the second mode is a kernel mode.

5. At least one computer-readable storage device storing computer-executable instructions that, when executed by a computing device that includes at least one processor and memory, cause the computing device to perform actions comprising:
   spinning, by the computing device via a thread in a first mode, on a resource that is locked, where the spinning comprises continuously checking a state of the resource, where the state indicated whether the resource is locked or unlocked;
   determining, by the computing device in response to the thread spinning for a predetermined period of time, that the thread is to be transitioned from the first mode to a second mode and put to sleep;
   transitioning, by the computing device in response to determining that the thread is to be transitioned from the first mode to the second mode, the thread to the second mode;
   checking, by the computing device via the thread in response to the thread being transitioned from the first mode to the second mode and prior to the thread being put to sleep, the state of the resource;
   returning, by the computing device in response to the checked state indicating that the resource is no longer locked, the transitioned thread from the second mode back to the first mode without putting the thread to sleep; and
   putting, by the computing device in response to the checked state indicating that the resource is still locked, the transitioned thread to sleep.

6. The at least one computer-readable storage device of claim 5 where the actions do not result in a context switch if the transitioned thread is returned back to the first mode without being put to sleep.

7. The at least one computer-readable storage device of claim 5 where the first mode is a user mode.

8. The at least one computer-readable storage device of claim 5 where the second mode is a kernel mode.

9. A computing device and at least one program module together configured for performing actions, where the computing device includes at least one processor and memory, the actions comprising:
   spinning, by the computing device via a thread in a first mode, on a resource that is locked, where the spinning comprises continuously checking a state of the resource, where the state indicated whether the resource is locked or unlocked;

determining, by the computing device in response to the thread spinning for a predetermined period of time, that the thread is to be transitioned from the first mode to a second mode and put to sleep;

transitioning, by the computing device in response to determining that the thread is to be transitioned from the first mode to the second mode, the thread to the second mode;

checking, by the computing device via the thread in response to the thread being transitioned from the first mode to the second mode and prior to the thread being put to sleep, the state of the resource;

returning, by the computing device in response to the checked state indicating that the resource is no longer locked, the transitioned thread from the second mode back to the first mode without putting the thread to sleep; and putting, by the computing device in response to the checked state indicating that the resource is still locked, the transitioned thread to sleep.

10. The computing device and the at least one program module of claim 9 where the first mode is a user mode.

11. The computing device and the at least one program module of claim 9 where the actions do not result in a context switch if the transitioned thread is returned back to the first mode without being put to sleep.

12. The computing device and the at least one program module of claim 9 where the first mode is a user mode or where the second mode is a kernel mode.

* * * * *